United States Patent [19]

Morrin, II et al.

[11] 3,995,253
[45] Nov. 30, 1976

[54] METHOD AND APPARATUS FOR ACCESSING HORIZONTAL SEQUENCES, VERTICAL SEQUENCES, AND RECTANGULAR SUBARRAYS FROM AN ARRAY STORED IN A MODIFIED WORD ORGANIZED RANDOM ACCESS MEMORY SYSTEM

[75] Inventors: Thomas Harvey Morrin, II, San Jose; David C. Van Voorhis, Los Gatos, both of Calif.

[73] Assignee: International Business Machines Corporation, Armonk, N.Y.

[22] Filed: Mar. 3, 1975

[21] Appl. No.: 554,782

[52] U.S. Cl. .................... 340/146.3 MA; 340/172.5
[51] Int. Cl.² ........................................ G06F 15/20
[58] Field of Search ... 445/1; 340/172.5, 146.3 MA, 340/173 R; 444/1; 178/DIG. 22, DIG. 34

[56] References Cited
UNITED STATES PATENTS

| | | | |
|---|---|---|---|
| 3,492,646 | 1/1970 | Bene et al. | 340/146.3 Q |
| 3,889,234 | 6/1975 | Makihara et al. | 340/146.3 MA |
| 3,899,771 | 8/1975 | Saraga et al. | 340/146.3 MA |
| 3,938,102 | 2/1976 | Morrin et al. | 340/146.3 MA |

OTHER PUBLICATIONS
Lewitan, "N Tables In One," *IBM Tech. Disclosure Bulletin*, vol. 13, No. 8, Jan., 1971, pp. 2182–2183.

*Primary Examiner*—Leo H. Boudreau
*Attorney, Agent, or Firm*—Otto Schmid, Jr.

[57] ABSTRACT

A conventional word organized random access memory is modified for image processing operations so that the $pq$ image points of any $1 \times pq$, $pq \times 1$ or $p \times q$ subarray of an $rp \times sq$ or smaller image array stored in the memory can be extracted or updated in a single memory cycle. The invention contemplates 2 $pq$ memory modules labeled from 0 to $2pq-1$ for storing the image points, each module being capable of storing $rs/2$ points in distinguishable cells, only one cell of which is randomly accessible in a single instant of time. The invention further contemplates accessing circuitry for causing each image point $I(i,j)$ of an image array to be routed to or from a memory module $M(i,j)$ according to the relation $M(i,j)=pq[(i/p)//2]+ (iq+i/2p+j)//pq$, where the notations "/" and "//" denote, respectively, the quotient and the remainder resulting from integer division. The accessing circuitry additionally causes image point $I(i,j)$ to be stored into or retrieved from a cell location $A(i,j)$ of module $M(i,j)$ according to the relation $A(i,j)=(i/2p)s+(j/q)$.

6 Claims, 17 Drawing Figures

APPARATUS FOR ACCESSING MODIFIED WORD ORGANIZED RAM

APPARATUS FOR ACCESSING MODIFIED WORD ORGANIZED RAM

FIG. 2A  MODULE ASSIGNMENT FUNCTION

| | j= 0 | 4 | 8 | 12 | 16 | 20 | 24 | 28 |
|---|---|---|---|---|---|---|---|---|
| i= 0 | | | | | | | | |
| 4 | 0 | 1 | 2 | 3 | 4 | 5 | 6 | 7 |
| 8 | | | | | | | | |
| 12 | 8 | 9 | 10 | 11 | 12 | 13 | 14 | 15 |
| 16 | | | | | | | | |
| 20 | 16 | 17 | 18 | 19 | 20 | 21 | 22 | 23 |
| 24 | | | | | | | | |
| 28 | 24 | 25 | 26 | 27 | 28 | 29 | 30 | 31 |

ADDRESS ASSIGNMENT FUNCTION

FIG. 2B

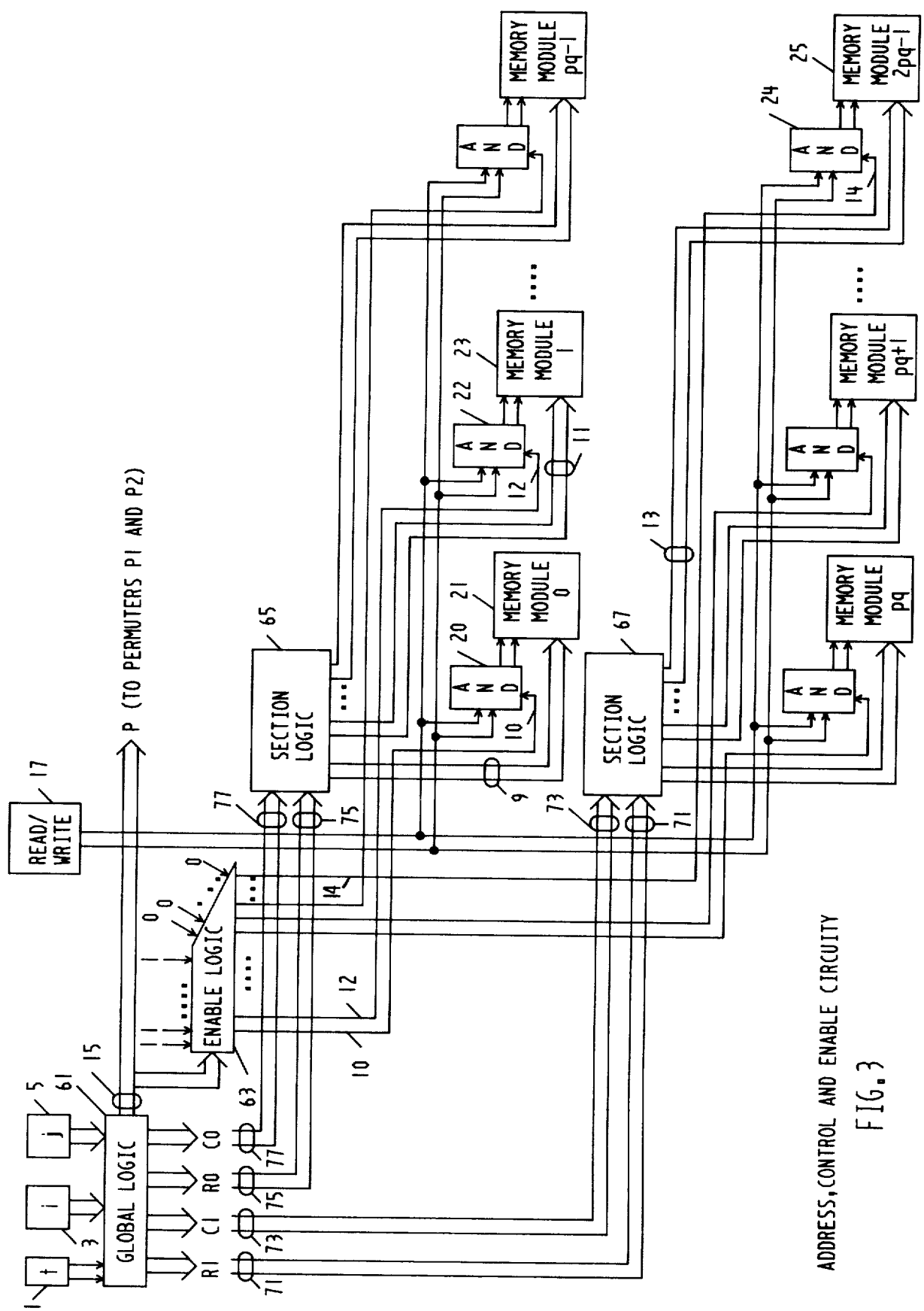

SECTION LOGIC

GLOBAL LOGIC

INPUTS: t;i;j

OUTPUTS: P={m2,t01,m1,m0}; RI={t00,y0,u1}; CI={t01,x1,j0,v1};
RO={t00,y0,u0}; CO={t01,x0,j0,v0}

CACULATIONS: t00=EQ(t,00); t01=EQ(t,01); t10=EQ(t,10)
x1=i/2p; i0=i//2p.
i2=i0/p; i1=i0//p.
x0=x1+t10·i2
y0=j/q; j0=j//q.
m2=t00·i2·pq+t01·i0+t10·i0·q
m1=(x1+j+t00·i1·q)//pq
m0=(x0+j+t00·j1·q)//pq
u1=m1/q; v1=m1//q
u0=m0/q; v0=m0//q

ROW LOGIC

INPUTS:      u; RO={too,yo,uo}.

OUTPUTS:     too;yu;eu.

CALCULATIONS:   $z=(u-uo)//p$ $yu=yo-too+too\cdot z$ $eu=EQ(z;o)$

COLUMN LOGIC

INPUTS: v; CO={to1,xo,jo,vo}

OUTPUTS: lv1;lo2;xv;to1

CALCULATIONS: xv=xo+to1[(v-vo)//q]

lv1=LT(v,vo)

lv2=LT([v-xo]//q,jo)

MODULE LOGIC

INPUTS: too;yu;eu;lv1;lv2;xv;to1

OUTPUTS: I(I,j,k,t)

CALCULATIONS: yk=yu+p·too·lv1·eu+too·$\overline{lv1}$+$\overline{to1}$·lo2.

I(I,j,k,t)=xv·s+yk

32-INPUT VARIABLE RIGHT ROTATE PERMUTER

RIGHT ROTATE 0/1

SPECIAL PERMUTER S1

16-INPUT VARIABLE RIGHT ROTATE PERMUTER

SPECIAL PERMUTER P2

ENABLE LOG

METHOD AND APPARATUS FOR ACCESSING HORIZONTAL SEQUENCES, VERTICAL SEQUENCES, AND RECTANGULAR SUBARRAYS FROM AN ARRAY STORED IN A MODIFIED WORD ORGANIZED RANDOM ACCESS MEMORY SYSTEM

BACKGROUND OF THE INVENTION

This invention relates to an access method and apparatus for selectively extracting or updating subarrays of a larger array stored in a modified word organized random access memory, and more particularly, relates to the modifications to a conventional word organized memory used for image processing.

As understood, a digital image is considered to be a two-dimensional array of image points, each of which comprises an integer or a set of integers. Image manipulation ideally subsumes the capability of storing an image array in a memory and operating upon selected clusters of points simultaneously, such as sequences of points in a single row or column of the array and points within a small rectangular area. This imposes the constraint that the memory must allow all points in any selected cluster to be accessed in one memory cycle. If any desired combination of points in the array could be accessed simultaneously from a bit addressable memory, then storage and retrieval of clusters of image points would pose no problem. However, because digital images form large arrays, only word organized memories are economically available. A conventional word organized memory includes a plurality of randomly accessible "words" of storage locations, each word of which can store a cluster of image points. However, it is necessary to modify the accessing mechanism of this conventional memory in order to permit access to clusters of image points when the points are not all in the same word of storage.

An image can be represented by an M × N array $I(*,*)$ of image points, where each point $I(i,j)$ for $0 \leq i < M$ and $0 \leq j < N$ is an integer or a set of integers which represents the color and intensity of a portion of the image. For simplicity, attention can be restricted to black/white images, for which $I(i,j)$ is a single bit of information. Typically, $I(i,j)=1$ represents a black area of the image, and $I(i,j)=0$ represents white area.

Images are most commonly generated by scanning pictorial data, such as 8 ½" × 14" documents. Thereafter, they can be stored, viewed from a display, transmitted, or printed. Since most scanners and printers process an image from top to bottom and from left to right, images are normally transmitted in the standard "row major" sequence: $I(0,0), I(0,1), \ldots, I(0,N-1), I(1,0), \ldots, I(M-1, N-1)$. Therefore, a memory system for image processing operations should at least permit simultaneous access to a number of adjacent image points on a single row of $I(*,*)$. This would permit the image or a partial image to be transferred rapidly into and out of the memory system, with many image points in each row being transferred simultaneously.

For image processing operations, such as character recognition, it is necessary to rotate an image or a partial image by a multiple of 90°. Such rotations are greatly facilitated by a memory system that permits simultaneous access to a number of adjacent points along any row or column of the image array $I(*,*)$. A memory system that permits such accesses can be used to rotate by ninety degrees (counterclockwise) an image transmitted in row major sequence. This is attained by (1) the transfer of the image into the memory row by row, starting with the uppermost row and storing many image points in each row simultaneously; and (2) the transfer of the image out of the memory column by column, starting with the rightmost column and retrieving many image points in each column simultaneously.

It is also desirable to access rectangular blocks of points within an image to accommodate another class of image processing operations, such as block insertion, block extraction, and contour following. For example, it may be desirable to add alphanumeric characters to the image from a stored dictionary, which dictionary includes a predefined bit array for each character. Similarly, it may be desirable to delete or edit characters to other rectangular blocks from an image. Lastly, algorithms for locating the contours of objects in the image involve moving a cursor from one image point to another along a border or boundary of an object. The contour following algorithms require rapid access to an image point and a plurality of its near neighbors, which together constitute a block of image points.

Typically, a word organized random access memory comprises a plurality of memory modules, each module being a storage device with a plurality of randomly accessible storage cells. Although each cell is able to store an image point which comprises a single bit of information, only one cell in a module can be accessed (read from or stored into) at a time. The accessing mechanism of a conventional word organized random access memory provides a single cell address to all of its constituent memory modules, so that the ith cell in one module can be accessed only in conjunction with the ith cell of all other modules. These cells together comprise the ith word of the memory. A conventional word organized random access memory thus provides access to a cluster of image points only if they are all stored in the same word of the memory. However, a suitable modification of the accessing mechanism for a word organized memory can permit access to any desired cluster of image points, provided each module stores at most one point in the cluster.

As previously stated, a memory system is desired which permits simultaneous access to horizontal sequences, vertical sequences, and rectangular blocks of image points. If the desired horizontal and vertical sequences include $pq$ image points, and if the dimensions of the desired blocks of image points are $p \times q$, then a memory system with at least $pq$ memory modules is required. Furthermore, a method for distributing the image points of an image array $I(*,*)$ among memory modules must be designed which places the $pq$ elements of $1 \times pq$, $pq \times 1$, or $p \times q$ subarray of $I(*,*)$ in distinct modules. Relatedly, it is necessary to design addressing circuitry which permits simultaneous access to these subarrays, and which arranges their elements into a convenient order, such as row major order.

Finally, for reasons of economy, it is desirable to limit the number of memory modules in the memory system to the minimum number. As has been mentioned, at least $pq$ memory modules are required, since each of the desired subarrays comprises $pq$ image points. Furthermore, it can be shown that a memory system with only $pq$ memory modules are not sufficient to permit access to all $1 \times pq$, $pq \times 1$, and $p \times q$ subarrays of an image array $I(*,*)$, since no distribution of the image points in I(*,*) among pq memory modules places the pq elements of all of these subarrays in distinct memory modules. Therefore, since the circuitry required to access stored subarrays is quite complicated unless p,q, and the number of memory modules are all powers of two, at least 2pq memory modules are required. The present invention discloses a memory system with precisely 2pq memory modules that permits access to all of the desired subarrays of I(*,*). Specifically, access is provided to all 1 × pq subarrays, all pq × 1 subarrays, and all p × q subarrays.

SUMMARY OF THE INVENTION

It is accordingly an object of this invention to modify a conventional word organized random access memory for image processing operations so that it is capable of storing an image or partial image therein, and so that it permits access to sequences of image points along any row or column of the image array and to the image points within an rectangular area of this array. Related, it is an object to modify a conventional word organized random access memory which stores an rp × q or smaller array such that any pq × 1, 1 × pq or p × q subarray of the image can be accessed (read or written) in a single memory cycle, p, q, r, and s being design parameters.

The foregoing objects are believed satisfied by an apparatus for storing black/white images, which apparatus includes a novel accessing arrangement. The apparatus comprises memory means for storing the image points in the cells of 2pq different memory modules, each module being an entity capable of storing rs/2 image points in distinguishable cells, only one cell of which is randomly accessible at a single instant of time. The apparatus further comprises means for extracting from the memory means horizontal or vertical linear sequences of length pq or rectangular matrices of dimension p × q, the starting point in the array for either sequence being arbitrary, and the starting point for matrices being arbitrary. Relatedly, the apparatus also comprises means for arranging the elements of the sequences or blocks accessed into row major order.

Restated, the disclosed apparatus includes 2pq memory modules labeled 0,1, . . . , 2pq−1, which modules can together store an rp × sq image array consisting of image points I(i,j), where i lies on the range 0 ≤ i < rp and j lies on the range 0 ≤ j < sq. Secondly, the disclosed apparatus includes routing means which cause image point I(i,j) to be routed to or from memory module M(i,j)=pq{i/p)//2}+(iq+q/2p+j)//pq, where the notations "/" and "//" denote, respectively, the quotient and the remainder resulting from integer division. Thirdly, the disclosed apparatus includes address calculation means which, in conjunction with the routing means, causes image point I(i,j) to be stored into or retrieved from location A(i,j)= (i/2p)s+(j/q) of memory module M(i,j). Lastly, the disclosed apparatus includes control means which achieves simultaneous storage or retrieval of the pq image points in any 1 × pq, pq × 1 or p × q subarray of the image array.

BRIEF DESCRIPTION OF THE DRAWINGS

FIGS. 2A and 2B illustrate the module assignment and the address assignment for the case that p=q=4, r=4, and s=8.

FIG. 3 shows the selective logical details of the address, control, and enable circuitry set forth in FIG. 1.

DESCRIPTION OF THE PREFERRED EMBODIMENT

Figure 1:
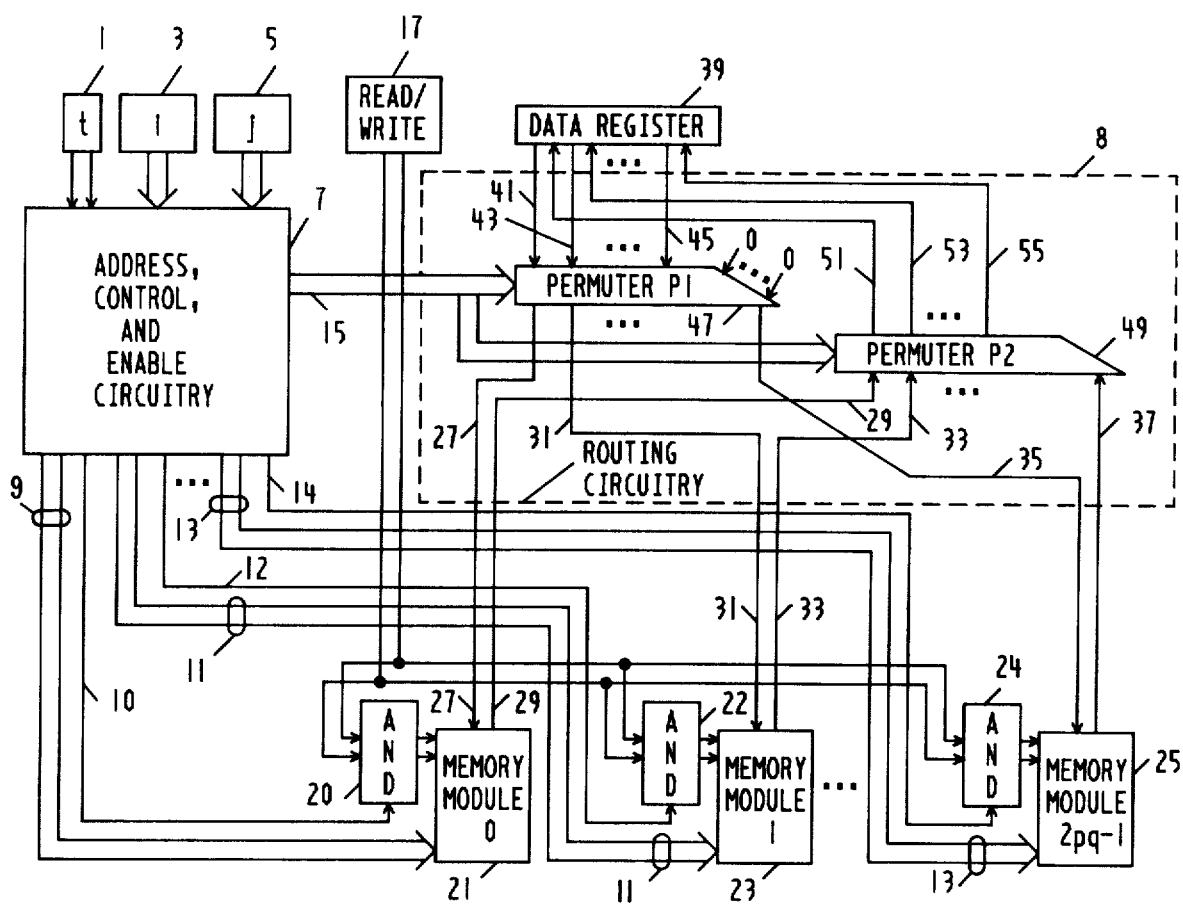
FIG. 1 shows the architecture of a word organized memory modified according to the invention.

Referring now to FIG. 1, there is shown the architecture for the modified word organized random access memory. The apparatus includes 2pq memory modules 21, 23, 35. Each module is able to store rs/2 image points. This means that each module stores rs/2 bits of information. Address, control, and enable circuitry 7 permits these modules to store any rp × sq (or smaller) image array I(*,*), and to access any 1 × pq, pq × 1 or p × q subarray of I(*,*). A data register 39 is provided to hold any of these pq element subarrays prior to storage or following retrieval of the image information from the memory modules. Also included are permuters 47 and 49. Permuters generally are specialized circuits for rearranging data. In the context of this invention, the permuters 47 and 49, respectively, route elements of the subarrays to and from the appropriate memory modules for storage and retrieval. Control of the permuters is resident in the address, control, and enable circuitry 7 and connectable thereto over path 15.

When a particular subarray is to be stored in the memory system, the contents of registers 1, 3, and 5 are used to determine the subarray shape and the coordinates (i,j) of the upper lefthand corner of the array as a reference point or base address. Thus, the two bit t register 1 is set to one of the values t=00, t=01, or t=10 in order to indicate whether the subarray shape is 1 × pq, pq × 1, or p × q. The i and j registers 3 and 5 are set to indicate coordinates of the upper lefthand element i(i,j) of the subarray. The subarray itself is placed in data register 39 in row major order, such that I(i,j) is in the leftmost position of the register. The subarray elements are provided to permuter 47 via lines 41, 43 and 45. Based upon the values of t, i and j, the control portion of address, control, and enable circuitry 7 causes permuter 47 to route each element of the subarray over counterpart lines 27, 31, and 35 to the module within which it is to be stored. The address portion of address, control, and enable circuitry 7 calculates its location within that module. The addresses are provided to the modules by lines 9, 11, and 13. The enable portion of the address, control and enable circuitry 7 provides enabling signals to the pq memory modules that are to store the subarray. The enable circuitry also provides disabling signals to the pq memory modules that are not to store subarray elements. These enabling and disabling signals are provided over lines 10, 12 and 14 to AND gates 20, 22 and 24 associated with counterpart memory modules 21, 23 and 25. Finally, a write signal provided on lines 19 from an external read/write control source 17 causes the pq elements of the subarray to be stored simultaneously in the pq enabled memory modules.

When a particular subarray is to be retrieved from the memory system, the $t$, $i$, and $j$ registers are set as described above so as to indicate the shape of the subarray and to identify its upper lefthand element. The enable portion of the address, control, and enable circuitry 7 enables the $pq$ memory modules that contain elements of the desired subarray. The enable circuitry also disables the $pq$ memory modules that do not contain an element of the desired subarray. The address portion of the address, control, and enable circuitry 7 uses the values of $t$, $i$, and $j$ in order to calculate for each enabled memory module the location of the unique element of the subarray which it contains. After the calculations are made, a read signal from 17 on lines 19 causes the pq elements of the subarray to be retrieved from the enabled modules and routed via lines 29, 33, and 37 to permuter 49. The control portion of the address, control, and enable circuitry 7 causes permuter 49 to arrange the elements of the subarray in row major order and to route them to data register 39 over lines 51, 53 and 55.

Whenever a $1 \times pq$, $pq \times 1$, or $p \times q$ subarray of $I(*,*)$ is retrieved from or stored into the memory system, the enable portion of the address, control, and enable circuitry 7 must calculate, for $0 \leq k < 2pq$, a Boolean value $f(i,j,k,t)$ that indicates whether the $k$th memory module is to supply or accept a subarray element. The address portion of the address, control, and enable circuitry 7 must calculate for $k$ in the range $0 \leq k < 2pq$, the location $1(i,j,k,t)$ of the unique element $e(i,j,k,t)$ of the subarray either contained by or to be placed in the kth memory module. The control portion of the address, control, and enable circuitry 7 must, in combination with permuters 47 and 49, arrange for element $e(i,j,k,t)$ to be routed to or from the appropriate position in register 39. Table 1 summarizes the calculations and the routing patterns required for access to a subarray whose upper lefthand element is image point $I(i,j)$. The calculations of the enabling function $f(i,j,k,t)$ and the address function $1(i,j,k,t)$ require the prior calculation of two auxiliary functions, $g(i,j,k,t)$ and $h(i,j,k,t)$. The routing pattern specification indicates which of the $pq$ positions $d(0), d(k), \ldots, d(pq-1)$ of data register 39 is to receive or supply element $e(i,j,k,t)$.

| Subarray Shape | t | Required Calculations |
|---|---|---|
| 1 × pq | 00 | $g(i,j,k,t)=(k-iq-i/2p-j)//pq$<br>$h(i,j,k,t)=(pq[k/pq]+g(i,j,k,t)-pq[(i/p)//2])//2pq$<br>$f(i,j,k,t)=1-h(i,j,k,t)/pq$<br>$l(i,j,k,t)=[i/2p]s+[j+g(i,j,k,t)]/q$<br>$e(i,j,k,t) \leftarrow \rightarrow d[h(i,j,k,t)]$ |
| pq × 1 | 01 | $g(i,j,k,t)=(k-i/2p-j)//pq$<br>$h(i,j,k,t)=(2p[g(i,j,k,t)//q]+p(k/pq)+$<br>$g(i,j,k,t)/q-i//2p)//2pq$<br>$f(i,j,k,t)=1-h(i,j,k,t)/pq$<br>$l(i,j,k,t)=[i/2p+g(i,j,k,t)//q]s+j/q$<br>$e(i,j,k,t) \leftarrow \rightarrow d[h(i,j,k,t)]$ |
| p × q | 10 | $g(i,j,k,t)=(k-[i+p-p(k/pq)]/2p-j)//pq$<br>$h(i,j,k,t)=(pq[k/pq]+g(i,j,k,t)-q[i//2p])//2pq$<br>$f(i,j,k,t)=1-h(i,j,k,t)/pq$<br>$l(i,j,k,t)=[(i+p-p[k/pq])/2p]s+[j+g(i,j,k,t)//q]/q$<br>$e(i,j,k,t) \leftarrow \rightarrow d[h(i,j,k,t)]$ |

TABLE 1

Exemplary circuitry implementing the above calculations and routing patterns is amply set forth in FIGS. 3–16, which are described below. Of course, it should be understood that alternative circuitry, for example, circuitry based upon table lookup, could be designed to perform the same functions.

The calculations and routing patterns noted above are based upon a predetermined distribution of image points among the $2pq$ memory modules. Before describing the preferred embodiments, appreciation of the true nature and scope of the invention will be enhanced by first considering the justification for the chosen distribution strategy.

Distribution Strategy

As stated previously, it is an object of the invention to construct a memory system capable of storing an $rp \times sq$ image array $I(*,*)$ consisting of image points $I(i,j)$, where $i$ lies in the range $0 \leq i < rp$ and $j$ lies in the range $0 \leq j < sq$. Furthermore, the memory system is required to store the image in a manner permitting access to all $1 \times pq$, $pq \times 1$, and $p \times q$ subarrays of $I(*,*)$.

If the memory system outlined in FIG. 1 is to store the image array $I(*,*)$, then for each image point $I(i,j)$ it is necessary to determine which of the $2pq$ memory modules 21, 23, or 25 should store $I(i,j)$. It was observed that when memory modules were assigned the memory module numbers $0, 1, \ldots 2pq-1$ as indicated in FIG. 1, the distribution of image points among the memory modules could be described succinctly by specifying an integer-valued module assignment function $M(i,j)$ with the following characteristic:

for any integers $i$ and $j$ on the range $0 \leq i < rp$ and $0 \leq j < sq$, the value of $M(ij)$ lies in the range $0 \leq M(ij) < 2pq$.

Each image point $.(i,j)$ is then stored in the $M(i,j)$th memory module.

If the memory system outlines in FIG. 1 is to store the image array $I(*,*)$ in a manner permitting simultaneous access to the $pq$ image points in any $1 \times pq$ subarray of $I(*,*)$, then these image points must be stored in different memory modules. This is because only one storage cell of each memory module is randomly accessible at a single instant of time. Similarly, if the memory system in FIG. 1 is to permit simultaneous access to the $pq$ image points in any $pq \times 1$ subarray of $I(*,*)$, or in any $p \times q$ subarray of $I(*,*)$, then these image points must also be stored in different memory modules.

It was unexpectedly observed that if the module assignment function $M(i,j)$ assumed the form $M(i,j)=pq[(i/p)//2]+(iq+i/2p+j)//pq$, where the notations "/" and "//" denote, respectively, the quotient and remainder of integer division, then the $pq$ image points of every $1 \times pq$ subarray, every $pq \times 1$ subarray, and every $p \times q$ subarray would be stored in different memory modules. This would permit simultaneous accessing of the pq image points in the desired subarrays.

Figure 2A:
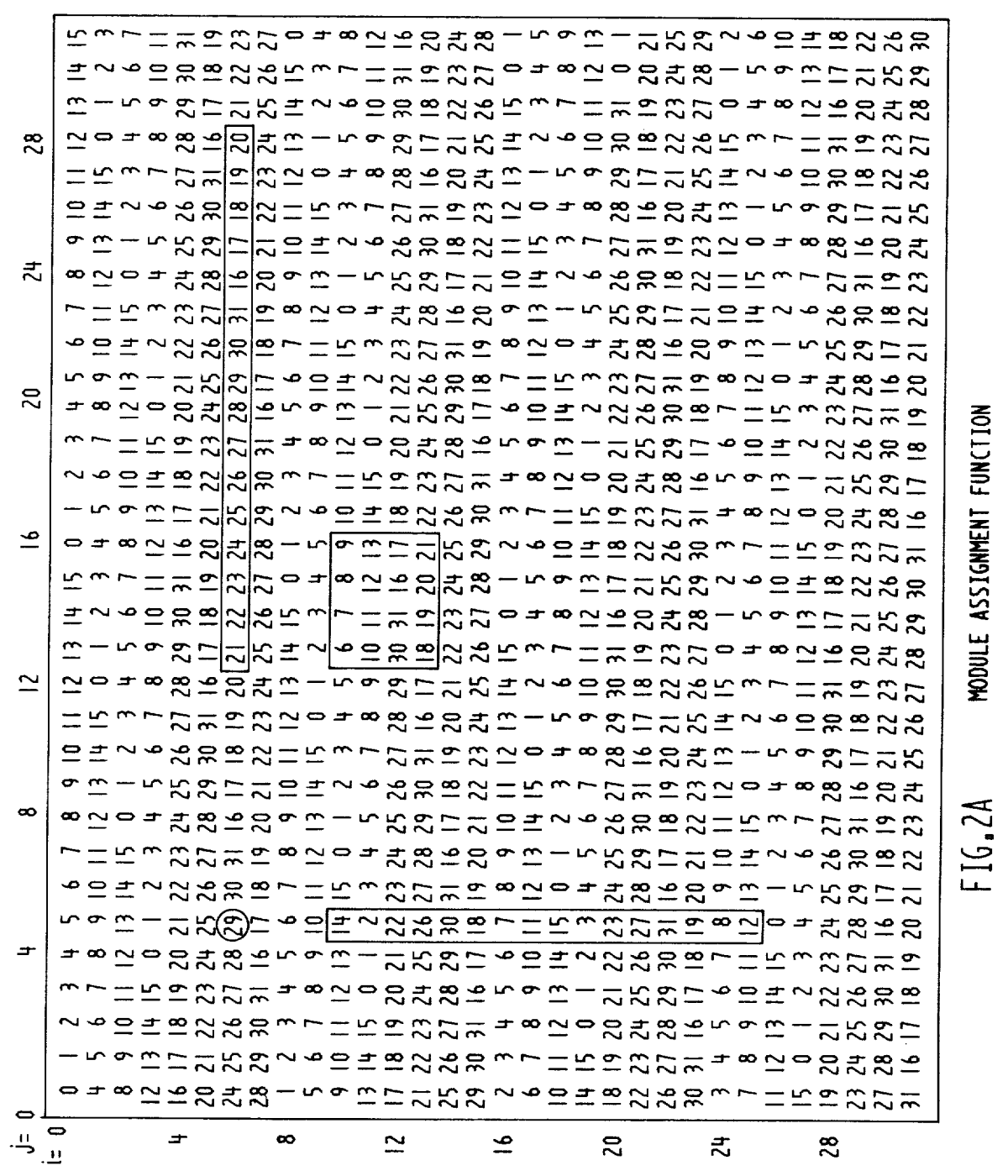

The module assignment function $M(i,j)=pq[(i/p)//2]+(iq+i/2p+j)//pq$ is illustrated in FIG. 2A for the case that $p=q=4$, $r=4$, and $s=8$. The decimal number in the $j$th position of the $i$th row of the 32 × 32 array in FIG. 2A denotes the memory module $M(i,j)$ for storing image point $I(i,j)$. For example, the circled entry in the 5th position of the 6th row is 29, which indicates that the image point $I(6,5)$ is stored in the 29th memory module. This may be calculated as $M(i,j)=M(6,5)=pq[(i/p)//2]+(iq+i/2p+j)//pq=4\times4[(6/4)//2]+[6\times4+6/(2\times4)+5]//(4\times4)=16[(1)//2]+(24+0+5)//16=16+13=29$ It should be readily observed from FIG. 2A that the $pq=16$ image points in any $1 \times pq = 1 \times 16$ subarray are stored in different memory modules. For example, the 6 element horizontal sequence indicated in FIG. 2A shows that the image points I(6,13),I(6,14), . . . , I(6,28) are stored, respectively, in memory modules 1,22,23,24,25,26,27,28,29,30,31,16,17,18,19, and 0. Also, it will be observed from FIG. 2A that the $q=16$ elements of any $pq \times 1 = 16 \times 1$ subarray are stored in different memory modules. For example, the vertical sequence indicated shows that the image points I(10,5),I(11,5), . . . , I(25,5) are stored, respectively, in memory modules 14,2,22,26,30,18,7,11,15,3,23, 7,31,19,8, and 12. Finally, it will be observed from FIG. 2A that the $pq=16$ image points in any $p \times q = 4 \times 4$ subarray are stored in different memory modules. For example, the $4 \times 4$ block indicated in FIG. 2A identifies the memory module assignments for the image points in the $4 \times 4$ subarray whose upper left-hand element is the image point I(10,13).

The above module assignment function $M(i,j)$ assigns $s/2$ image points to each of the $pq$ memory modules without specifying the cell locations in which they are to be stored. It was unexpectedly observed that the image points could be conveniently stored in location $A(i,j)$ of memory module $M(i,j)$ if such a function varied according to the form $A(i,j)=(i/2p)s+(j/q)$, where $i/2p$ and $j/q$ are integer quotients.

The address assignment function $A(i,j)$ is illustrated in FIG. 2B for the case that $p=q=4$, $r=4$, $s=8$. The decimal integer within each $2p \times q = 8 \times 4$ block indicates the address of the corresponding $2pq = 32$ image points. For example, the fifth position on the tenth row falls in the $4 \times 4$ block labeled with decimal 9. This indicates that image point I(10,5) is stored in the 9th cell of memory module M(10,5). This may be calculated as $A(i,j)=A(10,5)=[10/(2\times4)]8+(5/4)=(1)8+(1)=9$.

Structural Design

Referring now to FIG. 3, there is provided an overview of the address, control, and enable circuit 7 shown in FIG. 1. As indicated in FIG. 3, the $2pq$ memory modules 21, 23, and 25 are arranged into two groups of $pq$ modules. The address, control, and enable circuitry 7 comprises: a single global logic component 61; a single enable logic component 63; and two section logic components, 65 and 67.

The global logic component 61 operates in response to the subarray shape designation $t$ in register 1, and to the subarray starting coordinates $i$ and $j$ in registers 3 and 5, to calculate the quantities P,R1,C1,R0, and C0. The quantity P is supplied over lines 15 for control of the enable logic component 63 and for control of permuters 47 and 49. The quantities R0 and C0 are supplied over lines 75 and 77 to the section logic component 65, and the quantities R1 and C1 are supplied over lines 71 and 73 to the section logic component 67.

The enable logic component 63 operates in response to the quantity P calculated by the global logic component 61 and supplied on lines 15 to route $pq$ enabling 1's to the $pq$ memory modules that are to provide or receive the subarray described by the values in registers 1, 3, and 5. The enable logic component 63 also operates to route $pq$ disabling 0's to the $pq$ memory modules that are not to provide or receive the subarray elements. These enabling 1's and disabling 0's are routed via lines 10, 12, and 14 to AND gates 20, 22, and 24 associated with counterpart memory modules 21, 23, and 25.

The section logic components 65 and 67 operate in response to the values calculated by the global logic component and provided over lines 71, 73, 75, and 77. These section logic components calculate cell addresses for their associated memory modules. In particular, the cell address $l(i,j,k,t)$ is calculated for the kth memory module. The cell addresses are supplied to the respective memory modules over lines 9, 11, and 13.

Figure 4:
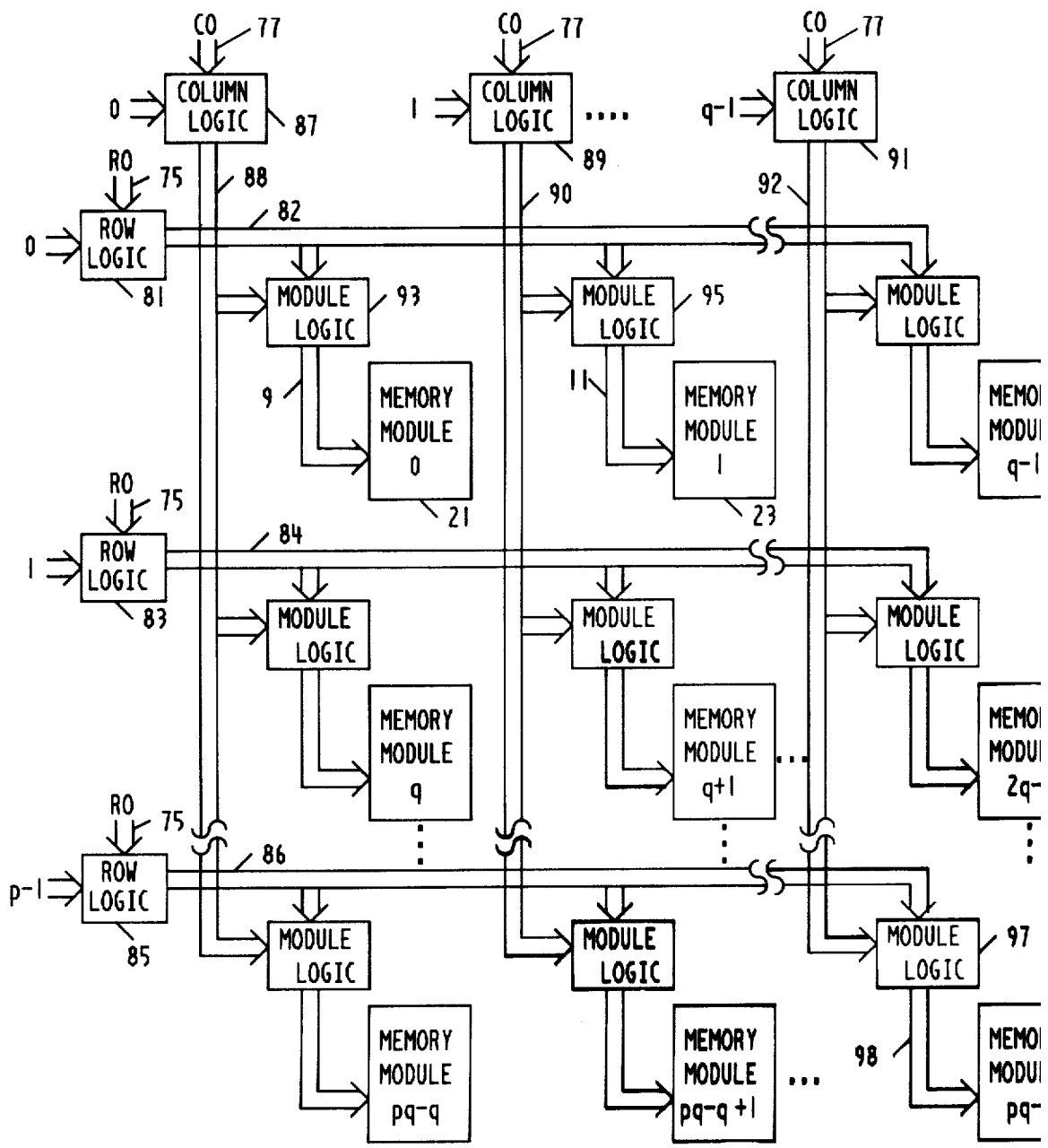
FIG. 4 shows the selective logic details of the section logic components seen in FIG. 3.

FIG. 4 provides an overview of the section logic component 65. As indicated in FIG. 4, the $pq$ memory modules serviced by this section logic component are arranged into $p$ rows of $q$ modules each. The section logic component comprises: $p$ identical row logic components 81, 83, and 85, one for each row of memory modules; $q$ identical column logic components 87, 89, and 91, one for each column of memory modules; and $pq$ identical module logic components 93, 95, and 97, one for each memory module.

Each of the row logic components 81, 83 and 85 operates in response to a fixed row designation number, and in response to the quantity R0 calculated by the global logic component 61, to calculate address information used for the calculation of cell addresses for memory modules in the associated row of modules. This address information is provided over line 82, 84 and 86 to the module logic components connected to these memory modules.

Each of the column logic components 87, 89 and 91 operates in response to a fixed column designation number, and in response to the quantity C0 calculated by the global logic component 61, to calculate address information used for the calculation of cell addresses for memory modules in the associated column of modules. This address information is provided over lines 88, 90, and 92 to the module logic components connected to these memory modules.

Each of the module logic components 93, 95 and 97 operates in response to the address information supplied by one of the row logic components 81, 83, or 85, and in response to the address information supplied by one of the column logic components 87, 89 or 91, to calculate a cell address. In particular, the module logic component associated with the kth memory module calculates the cell address $l(i,j,k,t)$. The cell addresses are supplied to the respective memory modules over lines 9, 11, and 98.

The section logic component 67 shown in FIG. 3 is identical to the section logic component 65 shown in FIG. 4, except that section logic component 67 operates on the quantities R1 and C1 provided by the global logic component 61 to calculate cell addresses for memory modules $pq$, $pq+1$, . . . , and $2pq-1$.

FIGS. 5–8 provide, respectively, the detailed logical embodiments of the global logic component 61; one of the row logic components 81, 83 or 85; one of the column logic components 87, 89 or 91; and one of the module logic components 93, 95 or 97. The operation of each component is described both algebraically and with an exemplary circuit design. The algebraic descriptions summarize the inputs to, outputs from, and calculations performed by each component. These algebraic descriptions are appropriate for any combination of design parameters $p,q,r$, and $s$. The exemplary circuit designs are specific for the case that $p=q=4$, $r=4$, and $s=8$.

Figure 5:
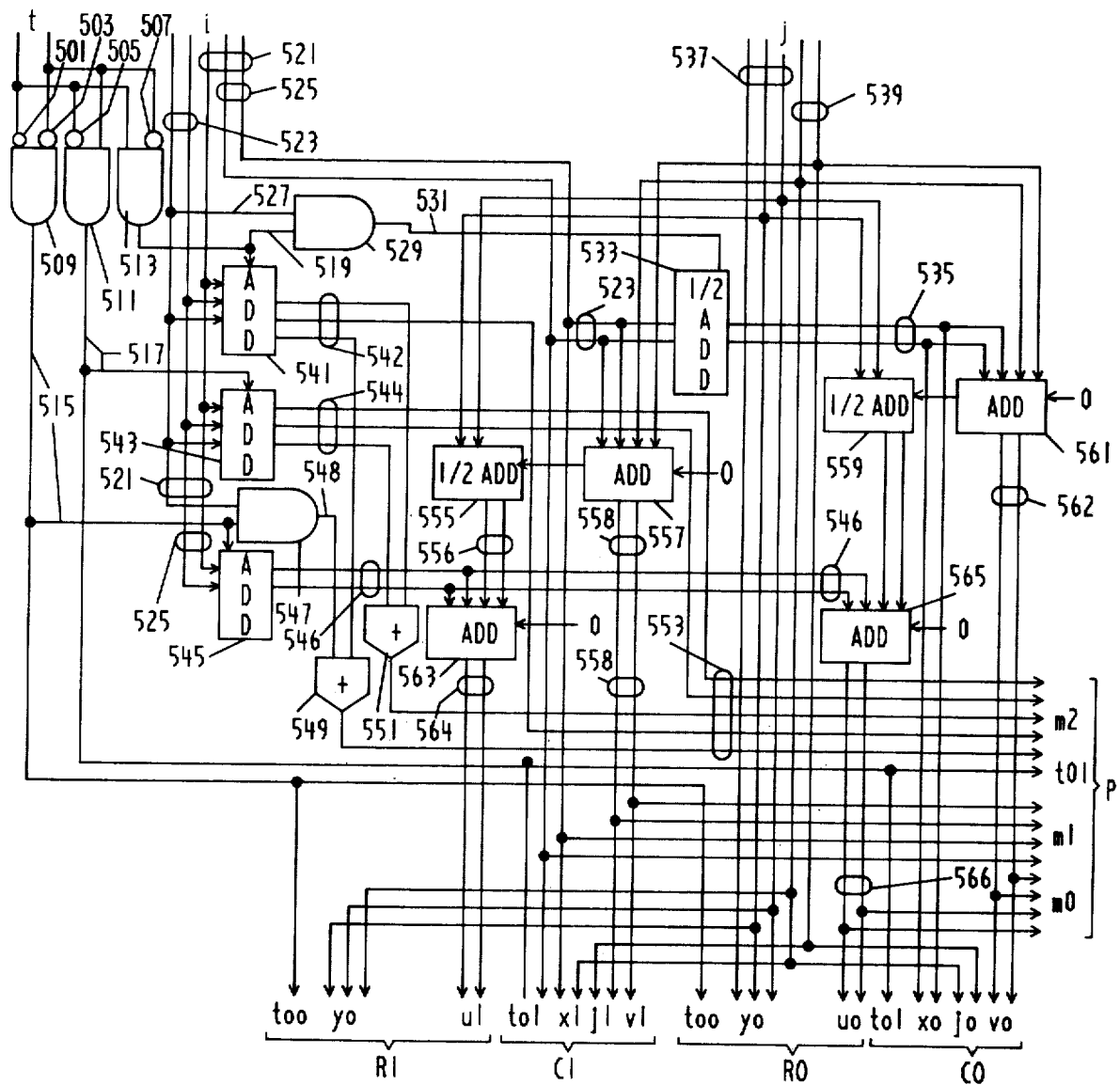
FIGS. 5–8 illustrate detailed logical designs of the global, row, column, and module logics of the counterpart functional elements seen in FIG. 4.

Referring now to FIG. 5, there is provided a detailed description of the global logic component 61. The inputs to this component are the subarray shape designation $t$ and the subarray starting coordinates $i$ and $j$. The outputs from this circuit are the quantities P, R1, C1, R0, and C0. As indicated in FIG. 5, each of these quantities comprises a bundle of signals. P consists of the values $m2$, $t01$, $m1$, and $m0$, R1 consists of the values $t00$, $y0$, and $ul$; $cl$ consists of the values $t01$, $x1$, $j0$, and $vl$; R0 consists of the values $t00$, $y0$, and $u0$; and C0 consists of the values $t01$, $x0$, $j0$, and $v0$. Each of these value is calculated according to the formulas provided in FIG. 5.

The first three values calculated by the global logic component are the quantities $t00$, $t01$ and $t10$. The quantity $t00$ is a Boolean value which is true if the input $t$ has the value $t=00$. This can be written symbolically as $t00=EQ(t,00)$. The quantity $t00$ is provided on line 515 by AND gate 509, operating in conjunction with INVERTERS 501 and 503. Similarly, the quantity $t01=EQ(t,01)$ is provided on line 517 by AND gate 511 and INVERTER 505. The quantity $t10=EQ(t,10)$ is provided on line 519 by AND gate 513 and INVERTER 507.

The next two values to be calculated by the global logic component are the quantities $xl=i/2p$ and $i0=i//2p$. That is $xl$ and $i0$ are, respectively, the quotient and the remainder that result from the integer division of $i$ by $2p$. Since the image coordinate $i$ is a binary-coded integer, and since $p=4$ and $2p=8$ for the exemplary circuit in FIG. 5, $i0$ is just the least significant three bits of $i$, and $xl$ is the remaining bits of $i$. The quantities $i0$ and $xl$ are provided, respectively, on lines 521 and 523.

The next two values to be calculated by the global logic component are the quantities $x2 = i0/p$ and $i1 = io//p$. Since $i0$ is the previously calculated binary-coded value appearing on lines 521, and since $p=4$ for the exemplary circuit in FIG. 5, $i2$ is just the most significant bit of $i0$ and $i1$ is the least significant two bits of $i0$. The quantities $i1$ and $i2$ are provided, respectively, on lines 525 and on line 527.

Another value to be calculated is the quantity $x0=x1+t10.i2$. AND gate 529 operates on the previously calculated Boolean variables $t10$ and $i2$ appearing, respectively, on lines 519 and 527. The output from AND gate 529 is the value $t10.i2$, which is supplied on line 531 to HALF-ADDER 533. The other input to HALF-ADDER 533 is the previously calculated quantity $x1$ appearing on lines 523. The output from HALF-ADDER 533 is thus the desired quantity $x0=x1+t10.i2$, which is supplied on lines 535.

The next two values to be calculated by the global logic component are the quantities $y0=j/q$ and $j0=j//q$. Since the image coordinate $j$ is a binary-coded integer, and since $q=4$ for the exemplary circuit in FIG. 5, $j0$ and $y0$ are, respectively, the least significant two bits of $j$ and the remaining bits of $j$. The quantities $j0$ and $y0$ are provided, respectively, on lines 539 and 537.

Another value to be calculated by the global logic component is the quantity $m2=t00.i2.pq+t01.i0+t1-0.i0.q$. As will be shown, this quantity is supplied on lines 553 by AND gates 541, 543 and 547 operating in conjunction with OR gates 549 and 551. If the previously calculated quantity $t00$ has the Boolean value $t00=1$, then evidently the input quantity $t$ must have the value $t=00$, and, hence, the previously calculated quantities $t01$ and $t10$ satisfy $t01=t10=0$. The value $t10=0$ appearing on line 519 serves to block AND gates 541, so that lines 542 contain the value zero. Similarly, the value $t01=0$ appearing on line 517 serves to block AND gates 543, so that lines 544 also contain the value zero. Thus, the least significant four lines of lines 553, which are supplied by lines 542, lines 544 and OR gate 551, are all zero. The most significant line of lines 553 is the value $t00.i2$ supplied on line 548 by AND gate 547 and transmitted by OR gate 549. Since this line comprises the most significant bit of $m2$, the resulting value of $m2$ is $m2=t00.i2.pq$. On the other hand, if the quantity $t01$ has the value $t01=1$, then evidently $t=01$ and $t00=t10=0$. In this case the value $t00=0$ blocks AND gate 547 so that a zero appears on line 548, and the value $t10=0$ blocks AND gates 541 so that a zero appears on lines 542. Hence, the value appearing on lines 553 is the value $m2=t01.i0$ provided by AND gates 543 and OR gate 551. Finally, if $t10=0$, then $t=10$ and $t00=t01=0$, so that the outputs from AND gates 543 and 547 are zero. Hence, the most significant three lines of lines 553 contain the value $t10.i0$ supplied by AND gates 541, OR gate 549, and OR gate 551. The resulting value on lines 553 corresponds to the value $m2=t10.i0.q$.

The next value to be calulated by the global logic component is the quantity $ml=(xl+j+t00.il.q)//pq$. For the exemplary circuit in FIG. 5, $p=q=4$, so that $ml$ is the least significant four bits of the sum of the previously calculated quantity $xl$ appearing on lines 523, the circuit input $j$, and the quantity $t00.i1.q$. Here, $t00$ and $i1$ are previously calculated quantities appearing, respectively, on line 515 and lines 525. The quantity $t00.i1$ is calculated by AND gates 545 and provide on lines 546. ADDER 557 and HALF-ADDER 555 served to add $x1$ and $j$, providing the least significant two bits of their sum on lines 558 and the most significant two bits of their sum on lines 556. Then, ADDER 563 augments the high order bits of the sum on lines 558 by the quantity $t00.i1$ appearing on lines 546, thus affecting the addition of $t00.i1.q$ to the sum of $x1$ and $j$. The resulting quantity $m1=(x1+j+t00.i1.q)//pq$ is provided on lines 564 and lines 558.

Another value to be calculated by the global logic component is the quantity $m0=(x0+j+t00.i1.q)//pq$. The calculation of $m0$ closely parallels the previously described calculation of the quantity $m1$. ADDER 561, HALF-ADDER 559, and ADDER 565 serve to provide $m0=(x0+j+t00.i1.q)//pq$ on lines 566 and 562.

The final four values to be calculated by the global logic component are the quantities $u1=m1/q$, $v1=m1//q$, $u0=m0/q$, and $v0=m0//q$. For the exemplary circuit in FIG. 5, these four quantities are, respectively, the most significant two bits of $m1$ appearing on lines 564, the least significant two bits of $m1$ appearing on lines 558, the most significant two bits appearing on lines 66, and the least significant two bits of $m0$ appearing on lines 562.

Figure 6:
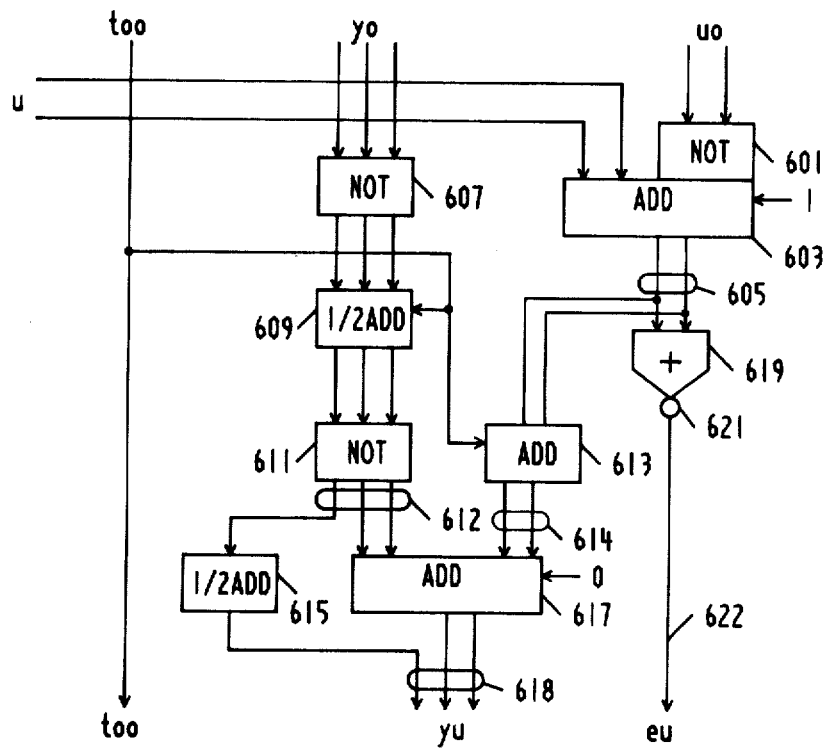

Referring now to FIG. 6, there is provided a detailed description of one of the row logic components 81, 83 or 85 shown in FIG. 4. More paraticularly, the row logic component associated with the $u$th row of memory modules is described, where $u$ lies in the range $0 < \mu < p$. The inputs to this row logic component are the row designation number $u$ and the bundle of signals R0. R0 comprises the values $t00$, $yu$, and $eu$, calculated by the global logic component 61. The outputs from the row logic component consist of the values $t00$, $yu$, and $eu$, calculated according to the formulas provided in FIG. 6. These values comprise address information used in the calculation of cell addresses for memory modules on the $u$th row of modules.

The first value to be calculated by the row logic component is the quantity $z=(u-u0)//p$. For the exemplary circuit in FIG. 6, INVERTER gates 601 and ADDER 603 serve to subtract $u0$ from $u$, according to the well-known relation for binary arithmetic, $u-u0=u+\overline{u0}+1$. The least significant two bits output on lines 605 from adder 603 comprise the quantity $z=(u-u0)//p$.

The next value to be calculated by the row logic component is the quantity $yu=y0-t00+t00.z$. Since $t00$ is a Boolean variable, INVERTERS 607, HALF-ADDER 609, and INVERTERS 611 serve to provide the quantity $y-t00$ on lines 612. AND gates 613 operate on the input value $t00$ and the previously calculated quantity $z$ to provide the quantity $t00.z$ on lines 614. Hence, ADDER 617 and HALF-ADDER 615 serve to provide the quantity $yu=y-t00+t00.z$ on lines 618.

The final value to be calculated by the row logic component is the quantity $eu=\text{EQ}(z,0)$. That is, $eu$ is a Boolean variable with the value $eu=1$ if $z=0$ and with the value $eu=0$ if $z \neq 0$. In FIG. 6, OR gate 619 and INVERTER 621 determine whether $z=0$ and provide the signal $eu=\text{EQ}(z,0)$ on line 622.

Figure 7:
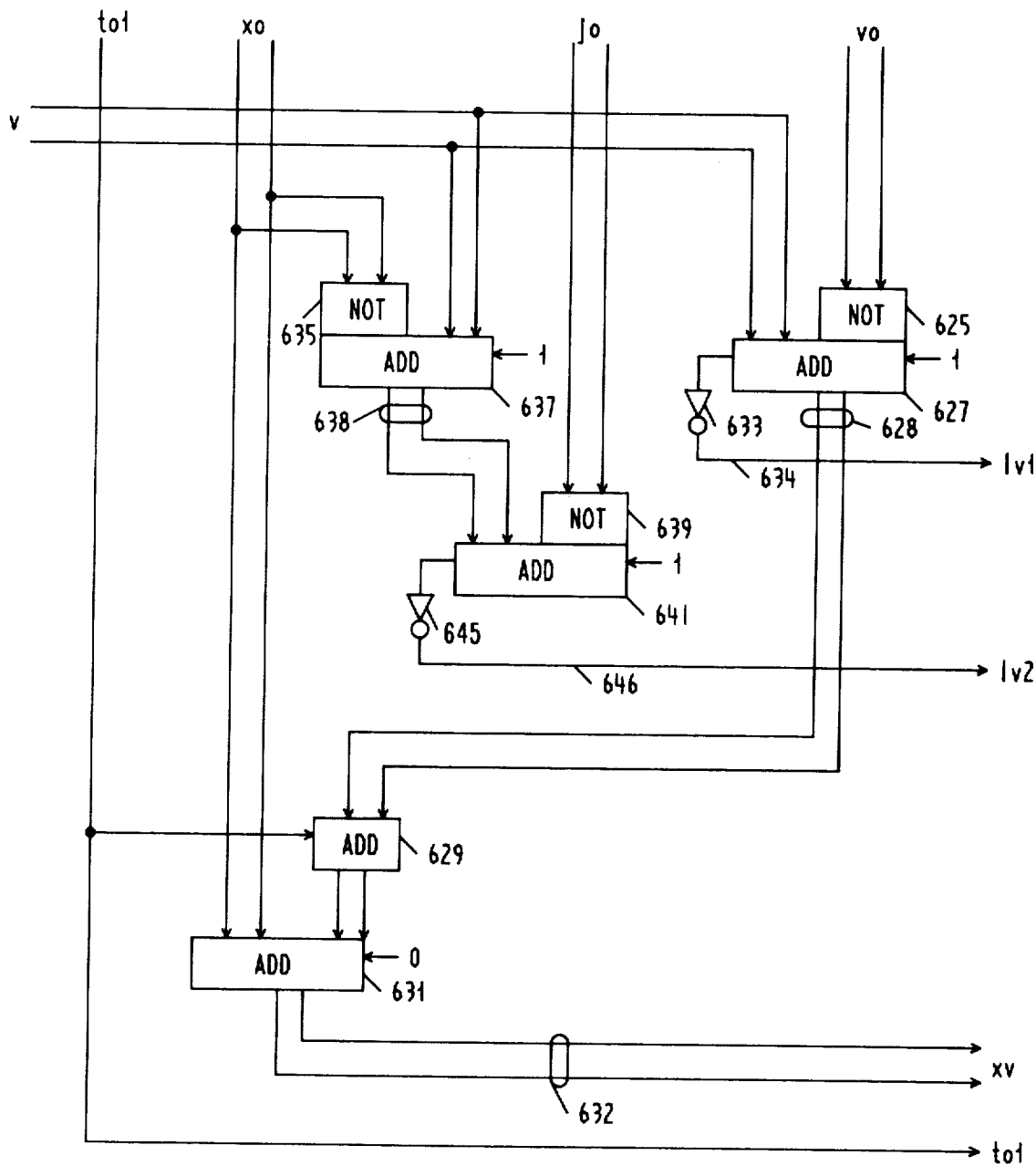

Referring now to FIG. 7, there is provided a detailed description of one of the column logic components 87, 89 and 91 shown in FIG. 4. More particularly, the column logic component associated with the vth column of memory modules is described, where $v$ lies in the range $0 \leq v < q$. The inputs to this column logic component are the column designation number $v$ and the bundle of signals C0. C0 comprises the values $t01$, $t0, j0$ calculated by the global logic component 61. The outputs from the column logic component consist of the values $lv1$, $lv2$, $xv$, and $t01$ calculated according to the formulas provided in FIG. 7. These values comprise address information used in the calculation of cell addresses for memory modules on the vth column of modules.

The first value to be calculated by the column logic component is the quantity $xv=x0+t01[(v-v0)//q]$. INVERTER gates 625 and ADDER 627 serve to subtract $v0$ from $v$. The least significant two bits output on lines 628 from ADDER 627 comprise the quantity $v-v0)//q$. Hence, AND gates 629 and ADDER 631 serve to supply the quantity $xv=x0+t01[v-v0)//q]$ on lines 632.

The next value to be calculated by the column logic component is the Boolean variable $lv1=\text{LT}(v,v0)$. That is, $lv1 = 1$ if $v<v0$, while $lv1=0$ if $v \geq v0$. INVERTER 633 operates on the carry from ADDER 627 to calculate $v1=\text{LT}(v-v0,0)=\text{LT}(v,v0)$, and this value is provided on line 634.

The final value to be calculated by the column logic component is the Boolean variable $lv2=\text{LT}([v-x0]//q,j0)$. In FIG. 7, INVERTER gates 635 and ADDER 637 serve to subtract $x0$ from $v$, providing the least significant two bits of this difference, namely $[v-x0]//q$, on lines 638 and, hence, to ADDER 641. ADDER 641 and INVERTER gates 639 serve to subtract $j0$ from the quantity $[v-x0]//q$. Finally, INVERTER 645 operates on the carry from ADDER 641 to calculate $lv2=\text{LT}$ $([v-x0]//q-j0,0)=\text{LT}([v-x0]//q,j0)$. The quantity $lv2$ is provided on line 646.

Figure 8:
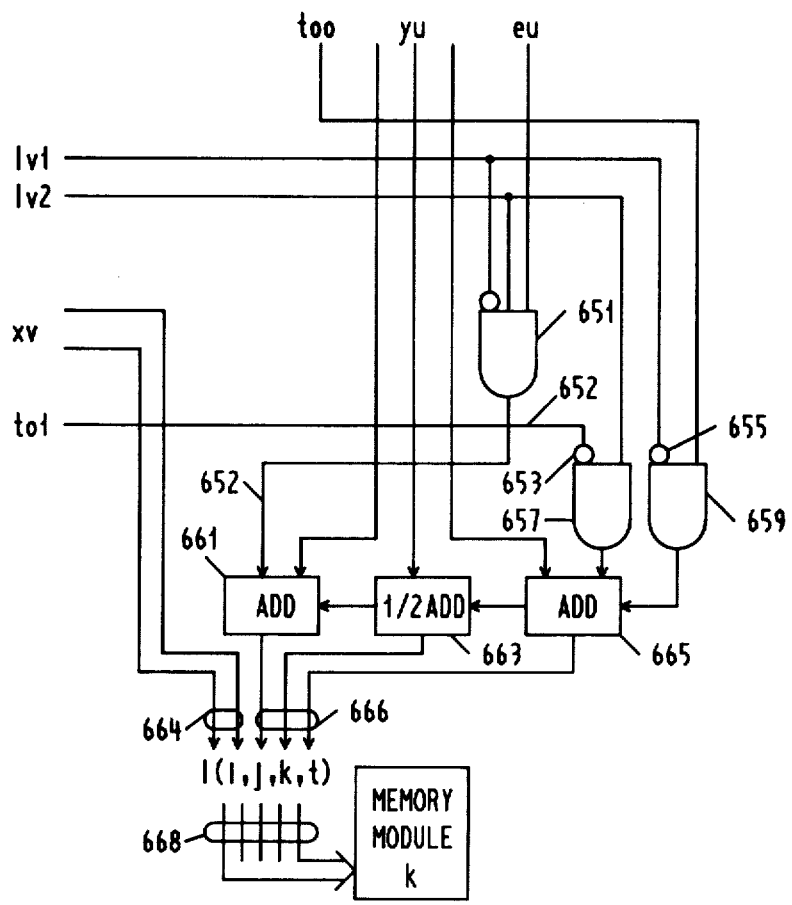

Referring now to FIG. 8, there is provided a detailed description of one of the module logic components 93, 95 or 97 shown in FIG. 4. More particularly, the module logic component associated with the kth memory module is described, where $k$ lies in the range $0 \leq k < pq$. The inputs to this circuit include the quantities $t00$, $yu$, and $eu$ provided by the uth row logic component, where $u$ and $k$ are related by the formula $u=k/q$. Additional inputs to the module logic component are the quantities $lv1$, $lv2$, $x0$, and $t01$ provided by the vth column logic component, where $v$ is related to $k$ according to the formula $v=k//q$.

The single output from the module logic component is the cell address $l(i,j,k,t)$ calculated cell to the formulas provided in FIG. 8. This cell address is provided to the kth memory module. Note, the combinational logic interior to the yk<memory module responsive to the cell address $l(i,j,k,t)$ may be fashioned according to any one of numerous methods, as for example, that shown in "Logical Design for Digital Computers" by Montgomery Phister, John Wiley and ) is New York, 1958.

The first value to be calculated by the module logic component is the quantity $yk=yu+p.t00.lv1.eu+t00.lv1+t01.lv2$. In FIG. 8, this quantity is calculated and provided on lines 666 by ADDER 661, HALF-ADDER 663 and ADDER 665. The Boolean quantity $t00.lv1.eu$ is calculated by AND gate 651 and is provided on line 652 to ADDER 661. ADDER 661 serves to add $p=4$ times this Boolean quantity on line 652 to $yu$, by adding the Boolean quantity on line 652 to the most significant bit of $yu$. The two Boolean quantites $t00.lv1$ and $t01.lv2$ are calculated, respectively, by INVERTER 655 and AND gate 659, and by INVERTER 653 and AND gate 657. These two Boolean values are added to the least significant bit of $yu$ by ADDER 665.

The final value to be calculated by the module logic component associated with the kth memory module is the 88 address $l(i,j,k,t)=xv.s+yk$. For the exemplary circuit in FIG. 8, $s=8$ and $yl$ 8, so that $l(i,j,k,t)$ can be achieved simply by justapositioning the previously calculated values $xv$ and $yk$ appearing, respectively, on lines 664 and 666. The cell address $l(i,j,k,t)$is supplied to the kth memory module over lines 668.

FIGS. 9–15 describe the routing circuitry 8 shown in FIG. 1. This routing circuitry includes permuters 47 and 49, which route image points of a $1 \times pq$, $pq \times 1$, or $p \times q$ subarray of points between the data register 39 and the memory modules 21, 23 and 25. The routing circuitry is controlled by the bundle of signals P provided on lines 15 by the global logic component 61 of the address, control, and enable circuitry 7, as shown in FIGS. 3 and 5.

Figure 9:
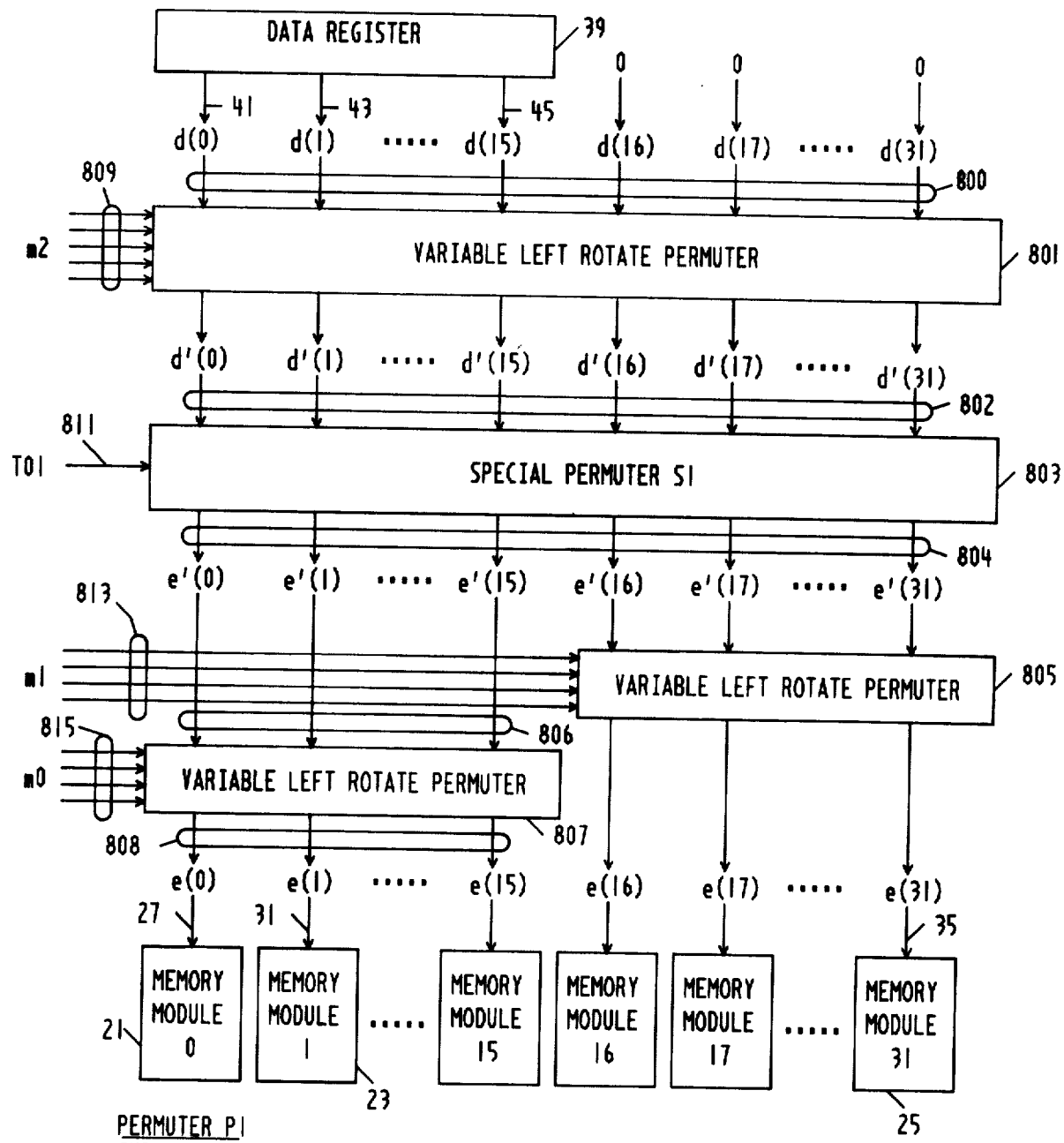
FIGS. 9–15 show detailed logic for the routing circuitry seen in FIG. 1.

Referring now to FIG. 9, there is provided an overview of the permuter P1 that routes subarray points from the data register 39 to the appropriate memory modules 21, 23, and 25. The operation of permuter P1 is described both algebraically and with an exemplary circuit design. The algebraic description is appropriate for any combination of design parameters $p$ and $q$, although the exemplary circuit design is specific for the case that $p=q=4$.

As shown in FIG. 9, permuter P1 comprises four separate permuters, three variable right rotate permuters 801, 805 and 807, and a special permuter 803. These four permuters are controlled by the values $m2$, $t01$, $ml$, and $m0$ appearing, respectively, on lines 809, 811, 813 and 815. These four values together comprise the bundle of signals P provided by the global logic component 61 of the address, control and enable circuitry 7 as shown in FIGS. 1, 3, and 5.

Figure 10:
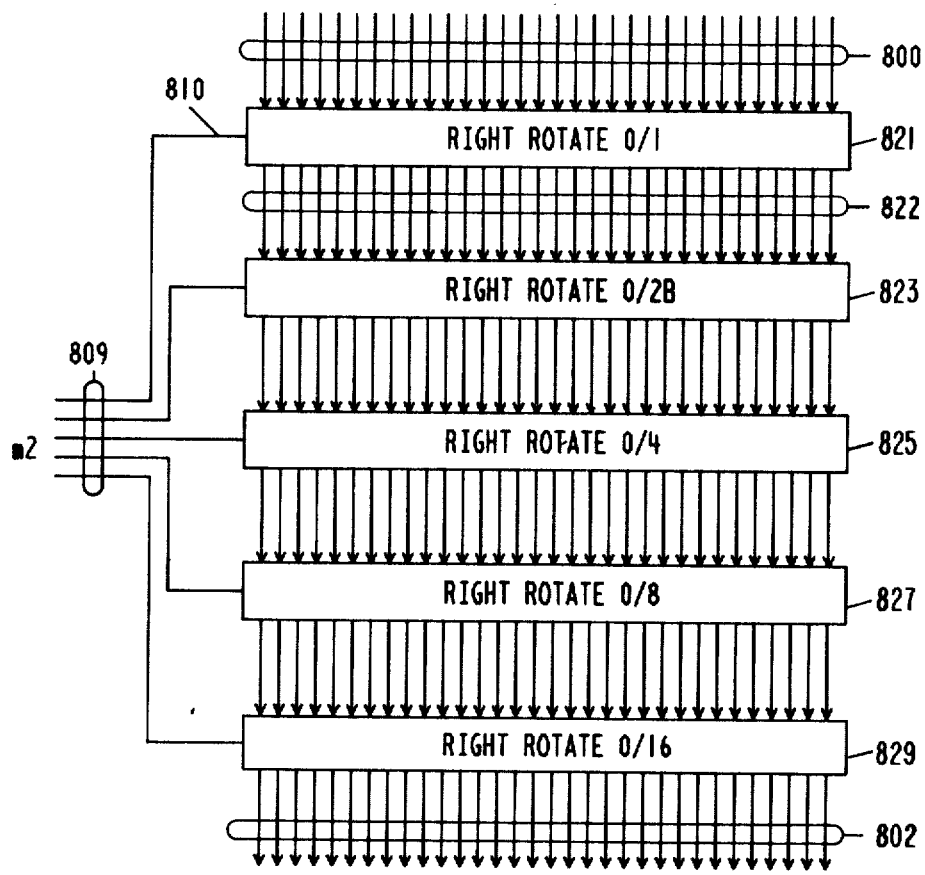

FIG. 10 provides an exemplary design for the 32-input variable right rotate permuter 801 shown in FIG.

9. This permuter has thirty-two data inputs on lines 800, one control input on lines 809, and thirty-two data outputs on lines 802. The sequence of image points input on lines 800 is rotated to the right by a number of positions equal to the binary control value $m2$ provided on lines 809, and the rotated sequence of points is output on lines 802. The circuit in FIG. 10 uses five simple permuters 821, 823, 825, 827 and 829 to achieve the desired rotation. Each of these simple permuters responds to a single bit of the control value $m2$ on lines 809 by rotating its inputs by a fixed amount if the control bit is a 1 and by not rotating its inputs if the control bit is a 0. For example, permuter 821 responds to the least significant control bit supplied thereto on line 810 by rotating its inputs one position to the right if the control bit is a 1 and by not rotating its inputs if the control bit is a 0. In either case the rotated or unrotated inputs are supplied by permuter 821 on lines 822.

Figure 11:
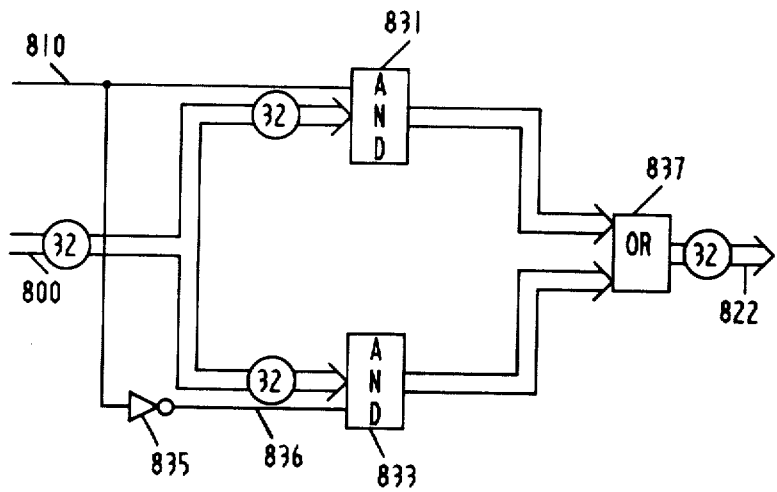

FIG. 11 provides an exemplary design for the permuter 821 shown in FIG. 10. The data inputs on lines 800 are provided without rotation to AND gates 833. These data inputs are also rotated to the right by one position and supplied to AND gates 831. If the control bit appearing on line 810 is a logical 0, then AND gates 831 are blocked, and INVERTER 835 provides an enabling signal on line 836 to AND gates 833. The data inputs on lines 800 are thus supplied without rotation to output lines 822, via AND gates 833 and OR gates 837. Conversely, if the control bit appearing on line 810 is a logical 1, then AND gates 831 are enabled, and INVERTER 835 provides a blocking signal on line 836 to AND gates 833. The data inputs on lines 800 are thus supplied in rotated form to the output lines 822, via AND gates 831 and OR gates 837.

Figure 12:
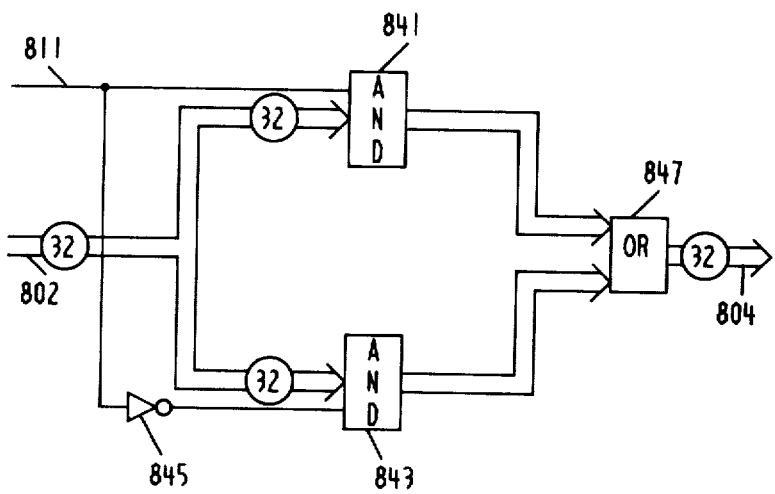

FIG. 12 shows the design of special permuter S1, which is labeled as permuter 803 in FIG. 9. This permuter has thirty-two data inputs $d'(0), d'(1), \ldots, d'(31)$ supplied thereto on lines 802, a single control bit $t01$ supplied on line 811, and thirty-two data outputs $e'(0), e'(1), \ldots, e'(31)$ provided on lines 804. As indicated in FIG. 9, the outputs provided by special permuter S1 on lines 804 can be described by the relation $e'(k) = \overline{t01} \cdot d'(k) + t01 \cdot d'(2p[k//q]+k/q)$, $0 \le k < 2pq$. That is, if the control input $t01$ is a logical 0, so that its complement $\overline{t01}$ is a logical 1, then the $k$th output $e'(k)$ equals the $k$th input $d'(k)$. In FIG. 12, the control input $t01=0$ on line 811 blocks AND gates 841, INVERTER 845 serves to enable AND gates 843, and the inputs appearing on lines 802 are transmitted in unpermuted order to the output lines 804, via AND gates 843 and OR gates 847. Conversely, if the control input $t01$ on line 811 is a logical 1, then the kth output $e'(k)$ becomes the input $d'(2p[k//9]+k/q)$. In FIG. 12, the control variable $t01=1$ enables AND gates 841 and is used by INVERTER 845 to block AND gates 843. The input $d'(2p[k//q]+k/q) = d'(8[k//4]+k/4)$ is thus routed to the output $e'(k)$, via AND gates 841 and OR gates 847.

Figure 13:
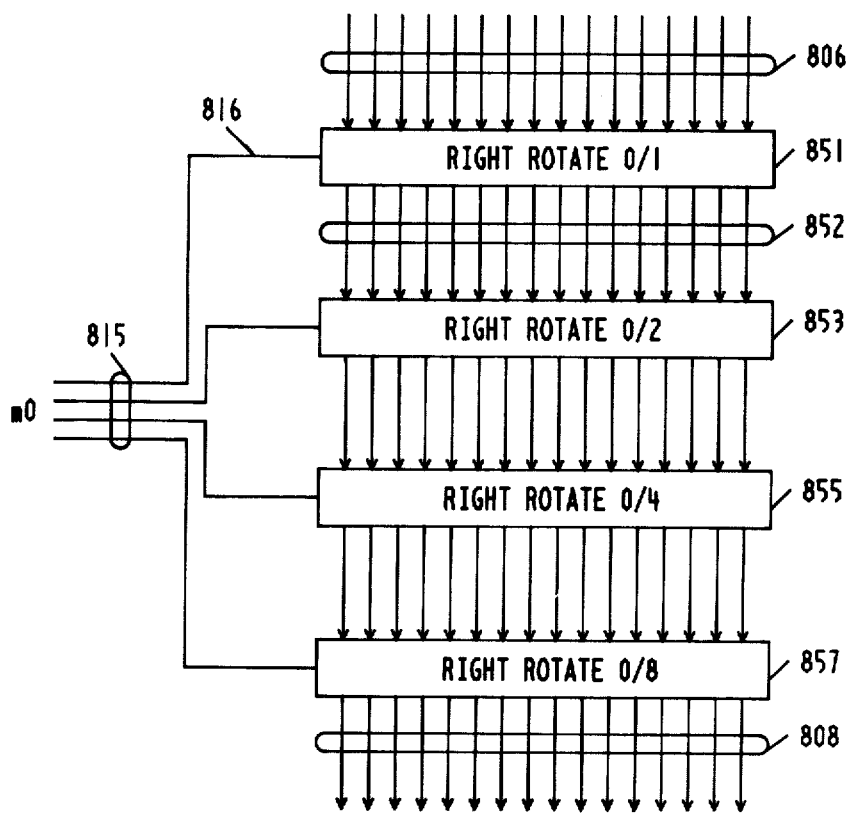

FIG. 13 provides an exemplary design for the variable right rotate permuter 807 shown in FIG. 9. This permuter has sixteen data inputs on lines 806, one control input on line 815, and sixteen data outputs on lines 808. The sequence of image points input on lines 806 is rotated to the right by a number of positions equal to the binary control value $m0$ provided on lines 815, and the rotated sequence of points is output on lines 808. The circuit in FIG. 13 uses four simple permuters 851, 853, 855, and 857 to achieve the desired rotation. Each of these simple permuters responds to a single bit of the control value $m0$ on lines 815 by rotating its inputs by a fixed amount if the control bit is a 1 and by not rotating its inputs if the control bit is a 0. For example, permuter 851 responds to the least significant control bit supplied thereto on line 816 by rotating its inputs one position to the right if the control bit is a 1 and by not rotating its inputs if the control bit is a 0. In either case the rotated or unrotated inputs are supplied by permuter 851 on lines 852. The permuters 851, 853, 855, and 857 are essentially small versions of permuters 821, 823, 825, and 827 shown in FIG. 10, and the design of these permuters is illustrated in FIG. 11.

The final permuter required in FIG. 9, permuter 805, is identical to permuter 807 shown in FIG. 13.

Figure 14:
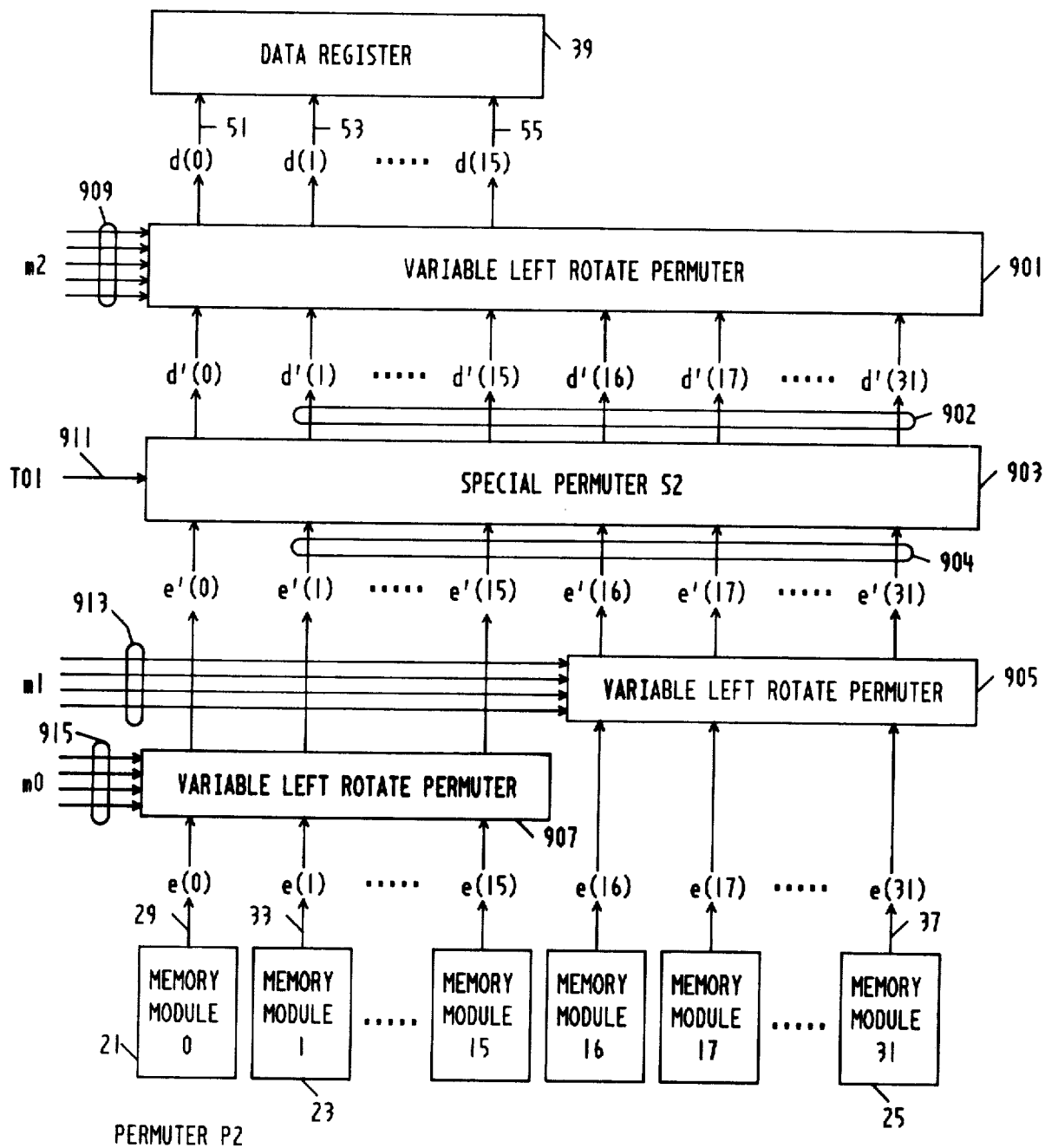

Referring now to FIG. 14, there is provided an overview of the permuter P2 that routes subarray points accessed from memory modules 21, 23, and 25 to the appropriate positions of data register 39. The operation of permuter P2 is described both algebraically and with an exemplary circuit design. The algebraic description is appropriate for any combination of the design parameters $p$ and $q$, although the exemplary circuit design is specific for the case that $p=q=4$.

As shown in FIG. 14, permuter P2 comprises four separate permuters, three variable left rotate permuter 901, 905, and 907, and a special permuter 903. These permuters are controlled by the values $m2, t01, m1,$ and $m0$ appearing, respectively, on lines 909, 911, 913 and 915. These four values together comprise the bundle of signals P provided by the global logic component 61 of address, control and enable circuitry 7 as shown in FIGS. 1, 3 and 5.

Figure 15:
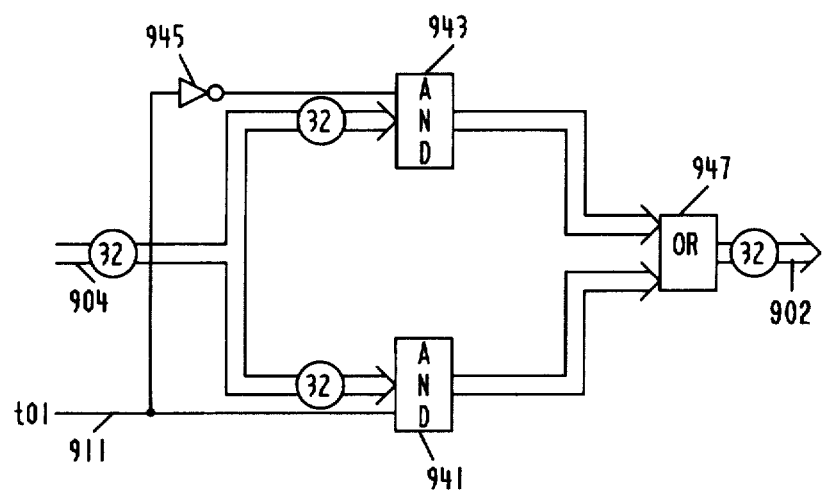

The variable left rotate permuters 901, 905 and 907 are simply upside-down versions of the variable right rotate permuters described by FIGS. 10, 11 and 13. The special permuter S2, which is labeled as permuter 903 in FIG. 14, is described in FIG. 15. As indicated in FIG. 15, the outputs $d'(0), d'(1), \ldots, d'(31)$ provided on lines 902 by special permuter S2 are one of two permutations of the inputs $e'(0), e'(1), \ldots, e'(31)$ supplied thereto on lines 904. In particular, if the control input $t01$ appearing on line 911 is a logical 0, then the outputs are identical to the inputs. This identity presentation is achieved by the circuit in FIG. 15 because the control input $t01=0$ blocks AND gates 941 and INVERTER 945 serves to enable AND gates 943, so that the inputs are transmitted by AND gates 943 and OR gates 947. Conversely, if the control input $t01$ is a logical 1, then the permutation achieved by special permuter S2 is described by the relation $d'(k) = e'(q[k//2p]+k/p)$, $0 \le k < 2pq$. In FIG. 15, the control variable $t01=1$ enables AND gates 941 and is used by INVERTER 945 to block AND gates 943. The input $e'(q[k//2p]+k/2p) = e'(4[k//8]+k/8)$ is thus routed to output $d'(k)$, via AND gates 941 and OR gates 947.

Figure 16:
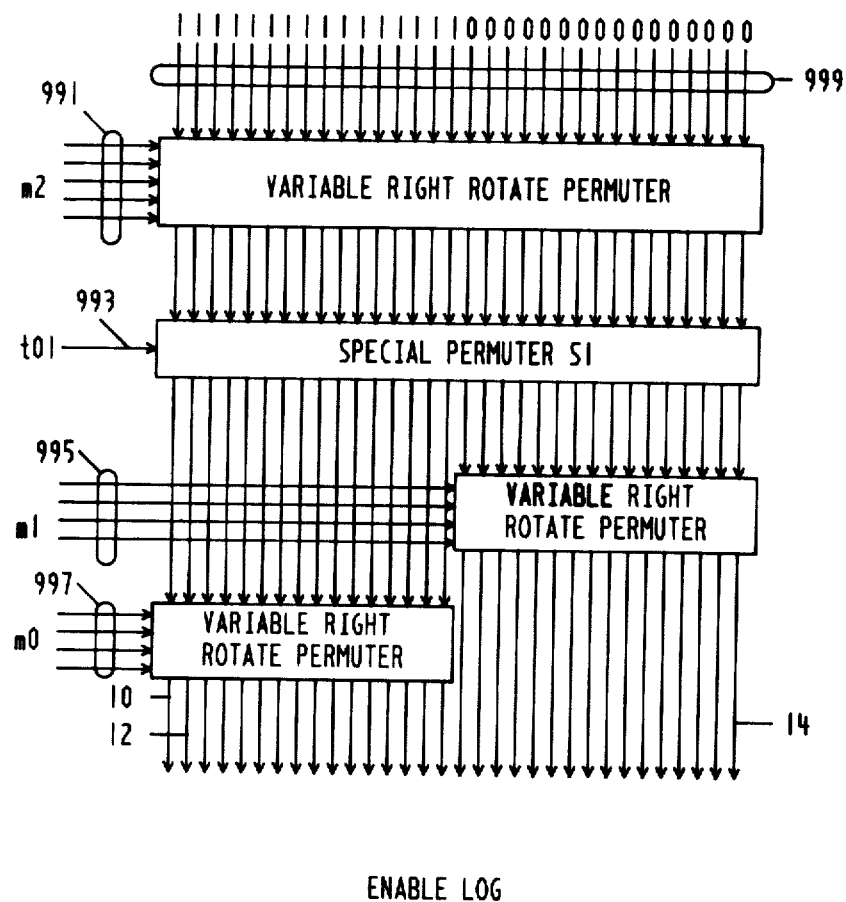
FIG. 16 shows detailed logic for the enable logic circuit shown in FIG. 3.

Referring finally to FIG. 16, there is provided an overview of the enable logic component 63 shown in FIG. 3. This circuit is a permuter identical to permuter P1, which is described by FIGS. 9-13. As shown in FIG. 16, the enable logic accepts an input $pq=16$ enabling 1's and $\overline{pq}=16$ disabling 0's. These inputs, which ae provided on lines 999, are routed by the enable logic component to lines 10, 12, ..., and 14 and, hence to AND gates 20, 22, ..., and 24, as shown in FIG. 3. The enabling 1's and disabling 0's thus serve to enable the $pq$ memory modules that are to provide or receive subarray elements and to disable the $pq$ memory modules that are not to provide or receive subarray elements. As shown in FIG. 16, the enable logic component is controlled by the values $m2$, $t01$, $ml$, and $m0$ appearing, respectively, on lines 991, 993, 995, and 997. These four values together comprise the bundle of signals P provided by the global logic component 61 of the address, control, and enable circuitry 7 as shown in FIGS. 1, 3 and 5.

In summary, a memory access method and apparatus has been described which permits access to any $1 \times pq$, $pq \times 1$ or $p \times q$ subarray within an image array of size $rp \times sq$ stored in a word organized random access memory, if the data is distributed and accessed according to the predetermined relationships described. The memory system implementing the distribution and access functions requires essentially only $2pq$ memory modules, three $2pq$ element permuters, and associated address calculation circuitry in order to provide access to the subarrays,. Also, the memory system can be extended by n-fold replication to handle grey scale or color images whose image points each require $n$ bits of storage, or to handle any other type of array.

It is to be understood that the particular embodiment of the invention described above and shown in the drawings is merely illustrative and not restrictive on the broad invention, that various changes in design, structure and arrangement may be made without departure from the spirit of the broader aspects of the invention as defined in the appended claims.

What is claimed is:

1. A word organized random access memory system modified for image processing operations so that the memory system can store an image array comparing a predetermined number $rpsq$ of image points arranged in a predetermined number $rp$ of rows with a predetermined number $sq$ of image points in each row, and modified so that every $1 \times pq$ subarray, every $pq \times 1$ subarray and every $p \times q$ subarray of the $rp \times sq$ image array can be accessed in a single memory cycle, the system comprising:

memory means (21, 23, 25) for storing $rpsq$ image points in the cells of $2pq$ different memory modules, each memory module being an entity capable of storing $rs/2$ image points in distinguishable cells, only one cell of each module being accessible at any single instant of time;

means (1,3,5) for selectively designating, from all $1 \times pq$ subarrays, all $pq \times 1$ subarrays and all $p \times q$ subarrays stored in said memory means, which subarray is to be accessed; and accessing means (7, 47, 39, 49) responsive to said designating means for causing each image point in the designated subarray to be selectively read from or written into a predetermined cell of a predetermined memory module so that the entire designated subarray is accessed in a single memory cycle.

2. A memory system according to claim 1, wherein the accessing means include:

a data register (39) having a capacity of at least $pq$ image points;

routing circuitry (7, 15, 47, 49) for causing each image point to be routed between the data register and the predetermined memory module; and address calculation circuitry (7,9,11,13) and enable circuiry (7,10,12,14,20,22,24) coacting with the routing circuitry for causing each image point to be selectively retrieved from or written into the predetermined cell location of the predetermined module.

3. A memory system according to claim 1 wherein the designating means include:

means (1) for designating the shape of the subarray to be accessed, and means (3,5) for designating the location of the starting point of the subarray to be accessed.

4. A memory system according to claim 1 wherein the memory modules are labeled as modules $0, 1, \ldots, 2pq-1$, and wherein the memory module predetermined for storing the $j$th image point on the $i$th row of the image array is given by the relation $pq[(i/p)//2] + (ig+j+i/2p)//pq$, which denotes the sum of two terms: $p$ times $q$ times the remainder that results from dividing 2 into the quotient $i$ divided by $p$; and the remainder that results from dividing the product $p$ times $q$ into the sum $i$ times $q$ plus $j$ plus $i$ divided by two times $p$.

5. A memory system according to claim 1 wherein the cells of each memory are labeled as cells $0, 1, \ldots, (rs/2)-1$, and wherein the cell predetermined for storing the $j$th image point on the $i$th row of the image array is given by the relation $(i/2p)s + (j/q)$, which denotes the sum of two terms: $s$ times the quotient when two times $p$ is divided into $i$; and the quotient when $q$ is divided into $j$.

6. A word organized random access memory system modified for image processing operations so that $pq$ image points of all $1 \times pq$ subarrays, all $pq \times 1$ subarrays and all $p \times q$ subarrays of at most an $rp \times sq$ image array $(I)^{*,*}$ storable in the memory system can be selectively retrieved from or written into the system in a single memory cycle; each image point $I(i,j)$ assuming a Boolean value when $i$ and $j$ lie in the respective ranges $0 \le i < rp$ and $0 \le j < sq$, the system comprising:

memory means (21, 23, 25) for storing $rpsq$ image points in the cells of $2pq$ different memory modules, each memory module being an entity capable of storing $rs/2$ image points in distinguishable cells, only one cell of each module being accessible at any single instant of time;

means (1) for designating the shape of a subarray to be accessed, as for example, with $t=00$ for a $1 \times pq$ array, $t=01$ for a $pq \times 1$ array and $t=10$ for a $p \times q$ array;

means (3,5) for designating the location of the starting point $I(i,j)$ of the subarray to be accessed;

a register (39) for holding at least $pq$ image points;

routing circuit (15, 47, 49) for causing the appropriate subarray points to be routed between the kth memory module and the $h(i,j,k,t)$th register location, where $k$ lies in the range $0 \le k < 2pq$ and where the function $h(i,j,k,t)$ is defined by the relation:

$h(i,j,k,t)=(pq[k/pq]+[k-iq-i/2p-j]//pq-pq\cdot[(i/p)//2])//2pq$, if $t=00$, which denotes the remainder that results when two times $p$ times $q$ is divided into the sum of three terms: $p$ times $q$ times the quotient of $k$ divided by $p$ times $q$; the remainder when two times $p$ is divided into $k$ minus the product $i$ times $q$ minus $j$ minus the quotient of $i$ divided by two times $p$; and minus $p$ times $q$ times the remainder that results from dividing 2 into the quotient $i$ divided by $p$.

$h(i,j,k,t)=(2p[(k-j-i/2p)//q]+p[k/pq]+[(k-j-i/2p)//q]//p-i//2p)//2pq$, if $t=01$, which denotes the remainder that results when two times $p$ times $q$ is divided into the sum of four terms: two times $p$ times the remainder that results when $q$ is divided into $k$ minus $j$ minus the quotient of $i$ divided by two times $p$; $p$ times the quotient of $k$ divided by $p$ times $q$; the remainder when $p$ is divided into the quotient of $q$ divided into $k$ minus $j$ minus the quotient of $i$ divided by two times $p$; and minus the remainder when $i$ is divided by two times $p$;

$$h(i,j,k,t) = (pq\lfloor k/pq \rfloor + \lfloor k-j-(i+p-p\lfloor k/pq \rfloor)/2p \rfloor //pq - q\lfloor i//2p \rfloor )//2pq, \text{ if } t=10,$$

which denotes the remainder that results when two times $p$ times $q$ is divided into the sum of three terms: $p$ times $q$ times the quotient of $k$ divided by $p$ times $q$; the remainder when $p$ times $q$ is divided into $k$ minus $j$ minus the quotient when two times $p$ is divided into $i$ plus $p$ minus $p$ times the quotient of $k$ divided by $p$ times $q$; and minus $q$ times the remainder when $i$ is divided by two times $p$;

enabling circuitry (7,20,22,24) for causing the kth memory module to store or retrieve a subarray element if the previously defined function $h(i,j,k,t)$ satisfies the relation $h(k,j,k,t) < pq$ and for inhibiting the kth memory module from storing or retrieving a subarray element if $h(i,j,k,t) \quad pq$; and addressing circuitry (7) for determining the appropriate cell location $l(i,j,k,t)$ within the kth module according to the relation:

$$l(i,j,k,t) = \lfloor i/2p \rfloor s + \lfloor j+(k-j-iq-i/2p)//pq \rfloor /q, \text{ if } t=00,$$

which denotes the sum of two terms: $s$ times the quotient when two times $p$ is divided into $i$; and the quotient when $q$ is divided into $j$ plus the remainder when $p$ times $q$ is divided into $k$ minus $j$ minus $i$ times $q$ minus the quotient of $i$ divided by two times $p$;

$$l(i,j,k,t) = \lfloor (i/2p) + (k-j-i/2p)//q \rfloor s + j/q, \text{ if } t=01,$$

which denotes the sum of three terms: the quotient of $i$ divided by two times $p$; and the remainder when $q$ is divided into $k$ minus $j$ minus the quotient of $i$ divided by two times $p$; and the quotient when $q$ is divided into $j$;

$$l(i,j,k,t) = \lfloor (i+p-p\lfloor k/pq \rfloor )/2p \rfloor s + \lfloor j+(k-j-(i+p-p(k/pq))]/2p)//q \rfloor /q, \text{ if } t=10,$$

which denotes the sum of two terms: $s$ times the quotient when two times $p$ is divided into $i$ plus $p$ plus $p$ times the quotient of $i$ divided by $p$ times $q$; and the quotient when $q$ is divided into $j$ plus the remainder when $q$ is divided into $k$ minus $j$ minus the quotient when two times $p$ is divided into $i$ plus $p$ plus $p$ times the quotient of $i$ divided by $p$ times $q$.

* * * * *

UNITED STATES PATENT OFFICE
CERTIFICATE OF CORRECTION

Patent No. 3,995,253    Dated November 30, 1976

Inventor(s) Thomas Harvey Morrin II et al.

It is certified that error appears in the above-identified patent and that said Letters Patent are hereby corrected as shown below:

Col. 3, line 51, "M(i,j)=pq[i/p)//2]+(iq+q/2p+j)//pq" should read --M(i,j)=pq[i/p)//2]+(iq+i/2p+j)//pq--;

Col. 6, line 55, "[(i/p)//2]+(iq+i/2p+j//pq" should read --[(i/p)//2]+(iq+i/2p+j)//pq--;

Col. 6, line 64, "+i/2p+j)//pq=4x4[(6/4)//2]+[6x4+6/(2x4)+5]//(4xλ" should read --+i/2p+j)//pq=4x4[(6/4)//2]+[6x4+6/(2x4)+5]//(4x--;

Col. 11, line 1, the word "firt" should read --first--;

Col. 12, line 19, "1.eu+t00.1v1+t01.1v2" should read --1.eu+t00.$\overline{1v1}$+$\overline{t01}$.1v2--;

Col. 12, line 27, "t00.1v1 and t01.1v2" should read --t00.$\overline{1v1}$ and $\overline{t01}$.1v2--;

Col. 13, line 46, "t01" should read --$\overline{t01}$--;

Col. 13, line 54, "d' (2p[k//9]+k/q)" should read --d' (2p[k//q]+k/q)--;

Col. 16, line 53, " 0 k<2pq" should read --0<k<2pq--;

Col. 17, line 13, "h(i,j,k,t)=(pq[k/pg]+[k-j-(i+p-p[k/pq])/2p]//pq" should read --h(i,j,k,t)=(pq[k/pq]+[k-j-(i+p-p[k/pq])/2p]//pq--;

Signed and Sealed this

Seventeenth Day of May 1977

[SEAL]

Attest:

RUTH C. MASON
*Attesting Officer*

C. MARSHALL DANN
*Commissioner of Patents and Trademarks*